April 24, 1973 TAKESHI IMAI ET AL 3,729,333
METHOD FOR FORMING AN INSULATION COATING
Filed Sept. 23, 1970
5 Sheets-Sheet 5

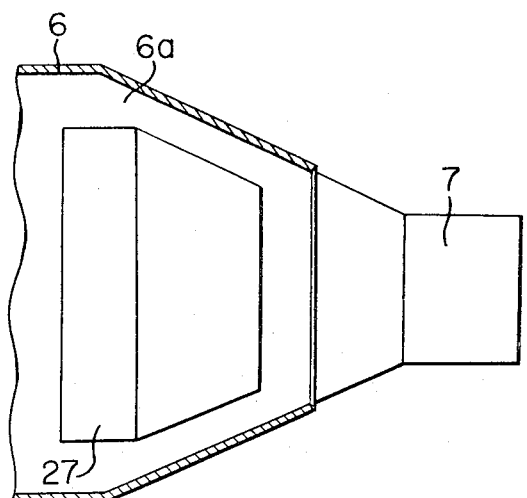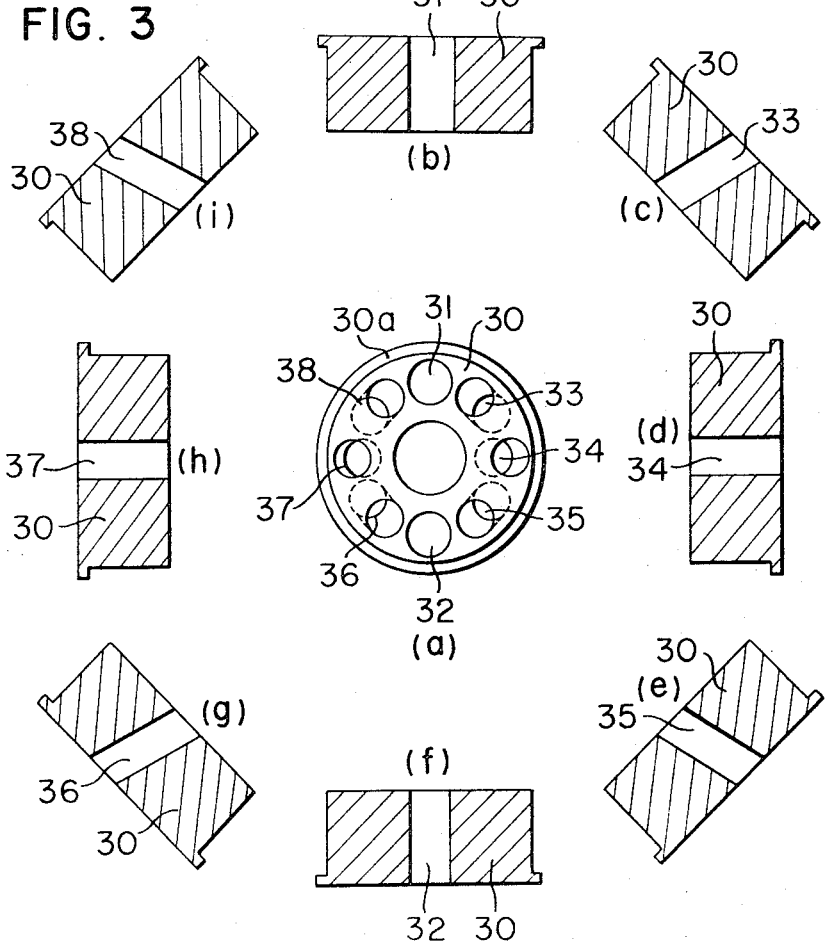

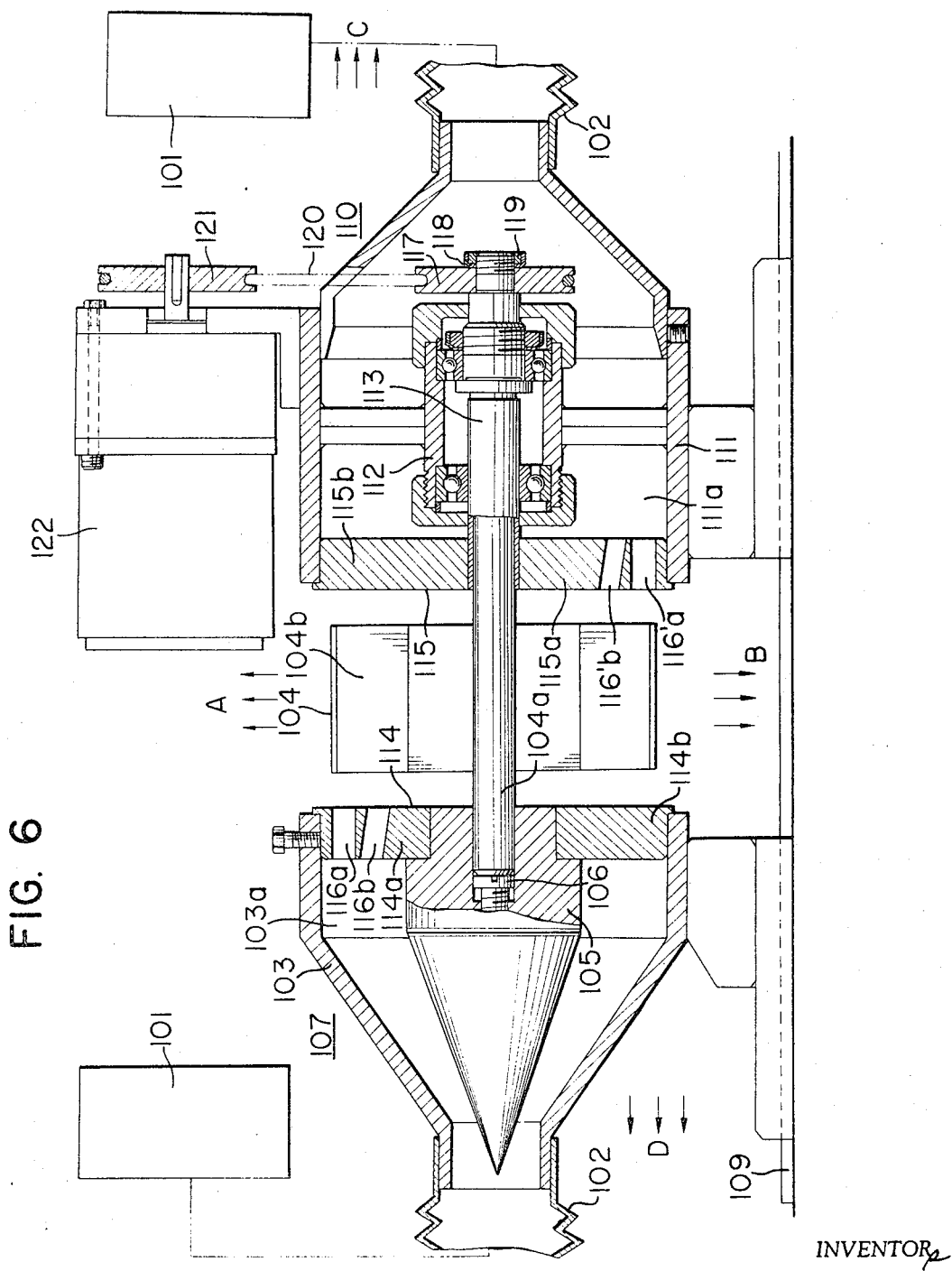

INVENTOR
Imai et al
BY Cushman, Darby & Cushman
ATTORNEY 3,729,333
METHOD FOR FORMING AN INSULATION
COATING
Takeshi Imai, Siniti Nomura, and Muneo Sumita, Kariya, Japan, assignors to Nippondenso Kabushiki Kaisha, Kariya-shi, Japan
Filed Sept. 23, 1970, Ser. No. 74,692
Claims priority, application Japan, Oct. 3, 1969, 44/79,304; May 11, 1970, 45/40,408
Int. Cl. B44d 1/094; B05b 5/02
U.S. Cl. 117—16         5 Claims

ABSTRACT OF THE DISCLOSURE

A method for forming an insulation coating on an iron core of an electric winding and like wherein heat meltable powder material is sprayed onto one end face of the core so as to impinge thereto with various angles, a portion of the powder material being deposited on said end face and remainder being passed through coil receiving grooves in the core impinging with various angles and partially depositing on the walls of the grooves, the portions of the powder material which has passed through the grooves being reflected by a powder shielding means disposed at the opposite side of the core so as to impinge on the opposite end face of the core, and the surplus powder material being removed and recovered by a suction mechanism such as a dust collector.

---

The present invention relates to a novel method for providing an insulation coating on an electric winding such as a rotor or a stator of an electric rotary machine, wherein thermally meltable powder material is used for forming the insulation coating.

Hithertofore, in order to provide an insulation between an iron core and a coil of an electric winding, an insulating paper or an organic insulating film has been inserted into a slot of the core whereupon a magnet wire has been wound around the iron core, however, this insulation method is disadvantageous in that it is difficult to apply to an automatic winding process so that a high production rate cannot be achieved. Recently, there has been developed and widely used in this art a so-called fluidized soaking powder coating process wherein a preheated electric winding is dipped in a vessel of fluidized powder plastic material so as to coat the entire core thereof. However, this process has an inherent disadvantage in that an insulating coating is formed even on such portions which do not require an insulation coating or, in other words, even on such portions where a magnet wire is not wound, such as the outer peripheral surface of a rotor and a rotor shaft, so that it is required to remove in a later process the insulation material adhering on the portions where an insulation is not required or is prohibited. This disadvantage is caused by the fact that the entire core of an electric winding is heated to a temperature at which the powder material is molten and thereafter directly dipped into a vessel of fluidized powder plastic material. Thus, in order to provide uncoated portions, it is desirable to mask the portions where the insulation is not required. However, in order to obtain a perfect masking effect, there will be required a complicated apparatus and additional steps, such as location of a masking jig with respect to an iron core of an electric winding, a masking step, a soaking step, and a careful removal of the masking so as to ensure the core shaft and the like kept free from powder plastic material. Further, even with this careful work, the insulation coating thus obtained will not always be uniform. Thus, the aforementioned fluidized dipping powder coating process requires a precise and careful control, increased steps and an improved technique and, moreover, a perfect automatic control cannot be expected.

More recently, in order to eliminate the above described disadvantages, a spray powder coating process has been developed. This process utilizes an annular symmetrical stator core and spray nozzles disposed so as to oppose with each other at the coil receiving portions of the core, and comprises step of discharging powder material from the opposed nozzles maintaining the core at a temperature at or about the melting point of the powder plastic material so that the discharged powder streams bump with each other within a slot of the core to form a coating. This process has been found effective to provide a uniform insulation coating on an iron core of a winding and the like. However, since a small compressed air pipe is used to discharge the powder from the nozzles disposed in the supply section, there have been encountered practical problems such as nozzle clogging and/or air pipe clogging caused by the powder material accumulated in the nozzles and/or the air pipe. Particularly, these problems become serious under a humid weather. Further, in an actual practice, variations in the pressure of the compressed air will cause uneven appearance of the coating so that an increased time is required to obtain an optimum adjustment. Even if a precise adjustment is made prior to the start of the process, readjustment will also be required every few hours. Thus, labour is always required in the coating line, so that it is very difficult to perform the process completely automatically.

An object of the present invention is to eliminate the above problems of the prior art by providing a method which can form a uniform layer of insulation coating at desired portions of an iron core and the like of an electric winding of an electric motor by using a very simple apparatus.

The present invention principally provides, in forming an insulation layer on an iron core and the like of an electric winding by using thermally meltable powder material, a method for forming an insulation coating on the coil receiving portion and the end faces, etc. of the iron core of the winding comprising step of supplying insulation coating powder material from a powder material spray means having a relatively large powder discharge port against the coil receiving portion and the end faces of the core in only one direction, maintaining the core and the like (hereinafter simply referred to as "article to be coated") of the electric winding. Thus, according to the present invention, the portion through which the powder material is passed or, in other words, the portion corresponding to the aforementioned nozzle and the air pipe is so formed that a sufficiently large flow path is provided to preclude clogging by the powder material, and only one powder material spray means is provided for the article to be insulated.

Among several ways for supplying powder material to the powder discharge port, a preferable way is to use a centrifugal blower, the powder material being supplied to the intake port of the blower by gravity or by a suitable forced feeding means and the sprayed powder flow being directed from the blower exit to said powder discharge port through a large pipe. This powder supply arrangement will provide the most effective means for providing a uniform and an improved insulation coating on an article to be insulated from a view point of automatic process control and elimination of effect of humidity.

According to one aspect of the present invention, powder material is supplied in only one direction to simultaneously form insulation coatings on the opposite end faces of the article to be coated. At the side of the article opposite to the side to which the powder material is supplied, there is provided a shield mechanism at a position apart from the adjacent end, face of the article so that the mechanism does not in effect contact with said end face for reflecting the flow of the supplied powder material so as to make the powder material completely enclose said end face, whereby the reflected powder flow effectively form an insulation coating on the end face adjacent to the side opposite to the side at which the powder material is supplied. Surplus powder material adhered on such portions where insulation coatings are not required is thereafter removed by suction by using for example a dust collector.

If the shield mechanism has an excessively small shielding surface, the thickness of the powder coating formed at the side adjacent to said shield mechanism will not be equal to that formed at the side where the powder material is supplied. Further, if the shield mechanism has an excessively large shielding surface, the powder material will be received on such portions where the coatings are not required. In other words, the powder material will be deposited on the portions other than the core of the winding unless a particular means such as masking is not employed. Thus, it is required to determine the effective shielding area at a suitable value. For example, for an ion core of a given diameter and a given coating area, the shielding area may be varied in accordance with the rate of supply of the power material, the supply pressure of the powder material, the suction pressure and the area of the suction line in the surplus powder removal system. Thus, according to the present invention, a suitable value of the shielding area can be selected within 35 to 380 percent of the reference area of an article to be coated.

Further, in case where the article to be coated has a rotational shaft, the shaft may be inserted into and held within the shield mechanism whereby the mechanism may have an additional effect of masking the shaft portion where the insulation coating is not required.

In order to assure that surplus powder material does not splash or deposit on undesirable portions and to obtain an insulation coating of a high grade, the surplus powder removal mechanism such as dust collector is required not only to have a sufficient suction power but also to have a suction port which is larger than the diameter of the article to be coated and that of the shield mechanism.

A further aspect of the present invention is to utilize electrostatically charged powders as the supply of powder material so as to obtain a high quality insulation coating. In this case, the article to be coated is maintained at the ambient temperature or around the softening point of the powder material and the charged thermally meltable powder material is supplied in the form of a flow distributed in the area equal to or smaller than the diameter of the article to be coated, whereupon the article is heated to a sufficiently high temperature to completely melt the deposited powder material. When electrostatically charged powder material is used, it will be deposited to some extent on the portions other than the coil receiving portion of the core such as the extreme outer portion of the core. This is advantageous for some products but may be disadvantageous for some other products. For example, in an automobile AC generator which is required to have a corrosion resistant property, a thin insulation coating formed on the extreme outer portion of the core will be effective to increase the corrosion resistant property. In this case, it will be preferable that the coating on the extreme outer portion of the core is thinner than those on the portions where the insulation coating is required, such as on the coil receiving portion and side portions of the core. Further, according to the present invention, it is preferred to use means for adjusting the direction of powder material supply. In case where the extreme outer portion is to be treated in a desired condition, such as a case where it is required to have a corrosion resistant property, the suction port of the dust collector may be arranged movably to and away from the article to be coated so that the suction effect is so regulated that a small amount (in practice, a negligibly small amount) of surplus powder material is deposited on the extreme outer portion of the article. This process is advantageous over a conventional electrostatic coating process because, according to the latter process, the coating formed on the extreme outer portion of the article to be coated will be as thick as those on the coil receiving portion and the side portions of the article so that the former coating will have to be machined in a later process.

According to a further aspect of the present invention, in additon to the feature of supplying the powder material in only one direction, the powder material spray means is constituted as will be described below in order to obtain a uniform coating of smooth appearance. Thus, the discharge port of the powder material spray means is provided with means for adjusting the flow direction of the powder material whereby the direction of the supply of the powder material is so adjusted with respect to the article to be coated, such as the sides and the coil receiving portion of the iron core of an electric winding that the powder material impinges on the wall of the coil receiving portion at a predetermined angle relative thereto. The adjusting means may comprise a spiral member, a blade rotor or a disc having apertures including at a predetermined angle. In case where a core of an electric winding is coated, it is preferred to use adjusting means which can adjust the flow of powder material substantially equal to or greater than the coil receiving groove in the core. When powder material is supplied through the adjusting means having the aforementioned function, the powder material impinges to the sides and the coil receiving groove of the core, so that a smooth coating can be obtained. In this case, the article to be coated and the powder material supply portion may be fixed with each other or, alternatively, they may be rotated relative to each other to obtain a desired coating. The inventors could successfully obtain a good coating by rotating the article to be coated while maintaining the powder material supply portion stationary, however, it should be understood that the present invention is in no way limited to such a particular process.

According to a further aspect of the present invention, in supplying powder material onto an end face of an article to be coated from a powder material spray means, while maintaining the article at a temperature sufficiently high to melt the powder material and rotating the article and the powder material spray means relative to each other, said spray means is disposed at the opposite sides of the article and provided with a plurality of discharge ports which are so arranged that the powder material discharged therefrom impinges to the material to be coated with various angles. This arrangement is effective when the article is a core of an electric winding because the supplied powder material effectively impinges to the inside wall of the coil receiving grooves of the core so that the bounced powder material is securely deposited on the groove wall.

According to a further aspect of the present invention, an insulation coating of uniform thickness and preferable appearance substantially free from pin holes can be obtained by providing a powder material shield mechanism adjacent to each powder material spray means for reflecting the powder material from the spray means disposed at the opposite side toward the required portions of the article to be coated, the powder material reflected by each of the shield mechanisms being deposited on the article at the side opposite to that at which the powder material is supplied. The inventors have found through several experiments that, by this arrangement, a remarkable effect can be obtained in forming a good insulation coating. For example, it has been found that, when the powder material is sprayed onto an article such as a rotatable core which is preheated to a temperature sufficient to melt the powder, a smoother coating can be obtained at the side where the reflected material is deposited than at the side where the supplied powder impinges.

According to a further aspect of the present invention, a surplus powder material is removed by a suitable suction mechanism such as a dust collector so that it does not splash or deposite on such portions where coatings are not required.

The present invention will now be described by way of example with reference to preferred embodiments illustrated in the accompanying drawings, in which:

FIG. 2 is a fragmentary sectional view showing a modified form of a powder material supply port which may be used in the apparatus shown in FIG. 1;

FIG. 3a is a front view of a powder material direction regulator used in the present invention;

FIGS. 3b through 3i show sectional views taken several portions of the regulator shown in FIG. 3a;

FIG. 6 is a sectional view of another apparatus for carrying out the method of the present invention, some portions of the apparatus being shown in elevation.

Figure 1:
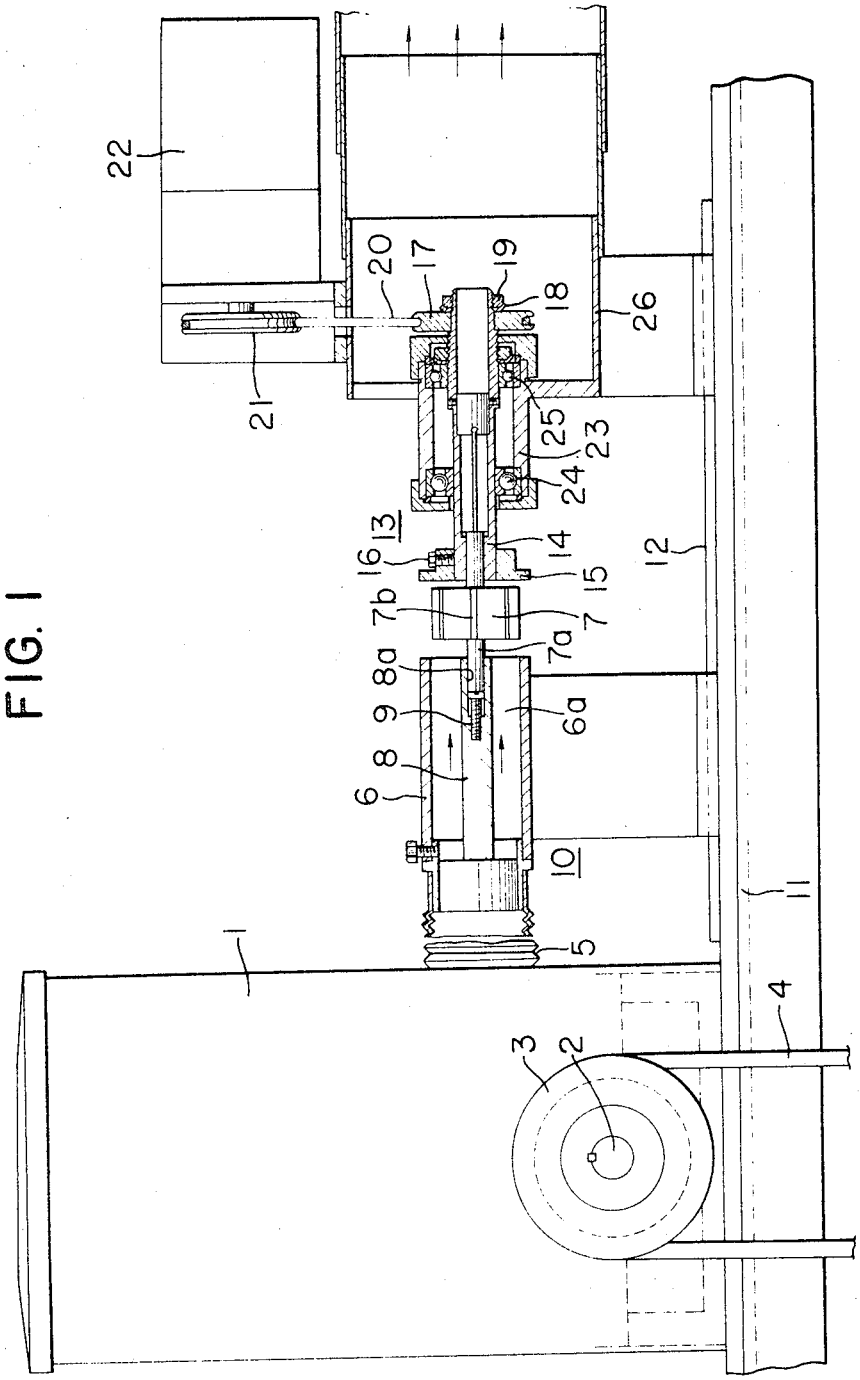
FIG. 1 is a front view of an apparatus for carrying out the method of the present invention, a portion of the apparatus being shown in section.

Referring to the drawings, particularly to FIG. 1, the reference numeral 1 shows a powder material supply means which serves to mechanically agitate powder material (thermally meltable powder material) in a tank to cause it substantially float in the tank and thereafter discharge it by gravity from a powder material discharge port provided therein toward an intake or outlet port of a centrifugal blower to cause the powder material to be carried by the air flow from the blower. The reference numeral 2 shows a drive shaft connected through a speed reduction means to the centrifugal blower, a pulley 3 keyed to the shaft 2 is connected through a belt 4 to a drive power source such as a variable speed motor to be driven thereby. The motor is variable in speed so as to regulate the amount of the supplied powder material. Thus, when the motor is operated, the powder material is carried from the supply means 1 by the action of the blower and then passed through an expansible bellows type guide pipe 5 to a holder 6 which has a powder material discharge port 6a and is capable of holding a portion of an article 7 to be insulated. Since the article 7 is an iron core which has a shaft 7a, the holder 6 is provided therein with a holding tool 8 which can hold and mask an end of the shaft 7a. A threaded member 9 is threadably inserted into the holding tool 8 for the purpose of adjusting the depth to which the shaft 7a is inserted into the holding tool 8. When the process is performed continuously, it is preferred to provide in the holding tool 8 a cooling system for circulating water or the like. Powder spray means 10 comprising the aforementioned holder 6 and the holding tool 8 is slidable on a sliding plate 12 mounted on a base 11 which serves to support several means of the apparatus now being described.

A powder material shield mechanism 13 is provided at the side opposite to the powder material spray means 10. The shield mechanism 13 includes a holding pipe 14 for holding and masking the other end of the shaft 7a of the core 7. The holding pipe 14 has at one end thereof a shielding plate 15 secured thereto by means of bolts 16 at a position apart from the adjacent end face of the core 7 so that it does not contact with said end face. The holding pipe 14 has at the other end a pulley 17 secured thereto by means of a washer 18 and a nut 19. The pulley 17 is driven by a motor 22 through a belt 20 and a pulley 21. Further, the holding pipe 14 is rotatably held by bearing means 23. The bearing means 23 has two bearings 24 and 25 and mounted on an expansible suction duct 26 which is connected with a suction mechanism (not shown). The shield mechanism 13 and the suction duct 26 are also slidable on the slidable plate 12.

In operation, the core 7 is preheated to a temperature sufficient to melt the powder material which is to be coated on the core, and mounted in the apparatus with one end of the shaft 7a received in the holding pipe 14 of the shield mechanism 13 and the other end in the bore 8a of the holding tool 8. Thereafter, the powder material supply means 1 operated to cause the powder material discharged from the discharge port 6a of the powder spray means 10 toward one end of the core 7. The powder material is sprayed in such a region that can just cover the end face of the core. Thus, the discharge port 6a should have an opening diameter determined in accordance with the distance between the opening and the end face of the core. Normally, the diameter of the opening may be substantially equal to or slightly smaller than the diameter of the core end face. However, when the holder 6 has a conical end as shown in FIG. 2 and a conical guide tool 27 received therein for concentrating the powder material toward the axis of the holder, the opening of the discharge port 6a may be larger than the diameter of the core 7.

Thus, a portion of the powder material sprayed from the port 6a is molten and deposited on the adjacent end face of the core 7 and the remainder of the powder material is passed through coil receiving grooves 7b partially depositing thereon and impinges to the shielding plate 15 of the shielding mechanism 13. Here, in order to cause as many powder material as possible deposited on the surfaces of the coil receiving grooves 7b, it is preferable to apply a rotation on the core 7. In this embodiment, by operating the motor 22, the holding pipe 14 is rotated through the pulley 21, the belt 20 and the pulley 17 to thereby rotate the core 7 secured to the holding pipe 14. The core 7 is continuously rotated throughout the period during which the powder material is supplied through the discharge port 6a.

The powder material impinged to the shield plate 15 is reflected toward the opposite end face and the adjacent portions of the coil receiving grooves of the core 7 to melt and deposit thereto. The shield plate 15 can be freely moved on the holding pipe 14 by loosening the bolts 16, whereby the position of the shield plate 15 is so adjusted that the stream of the reflected powder material covers throughout the adjacent end face of the core.

Surplus powder material is rapidly removed and recovered by a suction mechanism through the suction duct 26.

It is surprising that, by forming insulation coatings on required portions (the end faces and the coil receiving grooves) of the core 7, the extreme outer portions are kept substantially free from the powder material whereas the required portions are coated with layers of a good appearance. Particularly, an ideal coating can be formed on each end face of the core with the edge portions coated just like on flat portions. Further, the coil receiving portions such as the grooves 7b can have thin and smooth finish. Thus, according to the present invention, insulation coatings can be formed only on the desired portions of the core 7 without masking the outer periphery thereof.

When electrostatically charged powder is used, the core 7 is maintained at the ambient temperature or a temperature below the softening point of the powder material and the powder is deposited in a similar manner as previously described on the end faces and the coil receiving portions of the core 7. Thereafter, the core 7 is heated to a temperature sufficiently higher than the melting point of the powder material to cause the material adhere to the core. The reason why the core is not heated to a high temperature sufficient to melt the powder material is that, since the powder has an adhesive property due to its electrostatic charge, the powder will have a tendency to excessively adhere on the outer periphery of the core 7 if the core is heated to a high temperature. Of course, if the powder material is supplied to an excessively large area relative to the end faces of the core, a similar defect will be encountered. Generally, the area to which the powder is supplied should preferably be equal to or smaller than the diameter of an article to be coated.

Further, in order to obtain a more improved insulation coating, it is preferable to adjust the direction of the powder sprayed from the port 6a of the powder spray means 10 so that the powder material is uniformly impinged upon the end faces of the core 7 and the groove walls of the coil receiving portions. For this purpose, a direction regulator may be provided at the discharge port 6a.

According to one embodiment of the present invention, a regulator as shown in FIG. 3 may conveniently be used.

Figure 5:
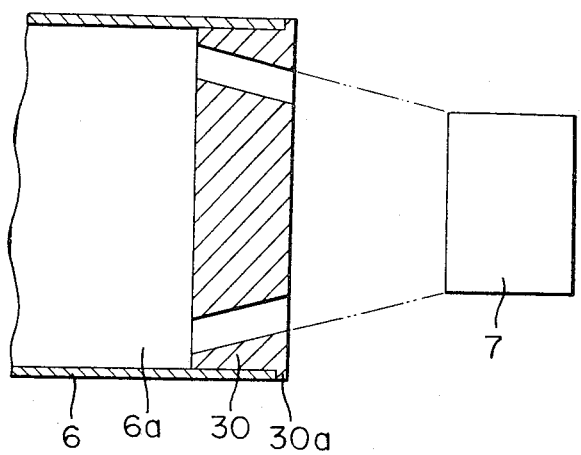
FIG. 5 is an example of installation of the regulator shown in FIG. 3 on the powder material supply port.

In FIG. 3, a regulator body 30 is disc shaped and has a flange 30a at one end. The body 30 is mounted on the discharge port 6a of the holder 6 as shown in FIG. 5. The body 30 is provided with uninclined holes 31 and 32 which do not have any influence on the direction of powder flow and a series of inclined holes 33, 34, 35, 36, 37 and 38 which regulate the direction of the discharged powder flow. Each inclined hole has an angle relative to the horizontal direction so as to regulate the direction of powder flow, whereby the powder is caused to deposit uniformly on the end faces and the coil receiving grooves 7b of the core 7.

As an example, when the powder material is supplied in only one direction, the holes 33, 34 and 35 may be inclined by about 13 degrees with respect to the direction of powder supply, that is, horizontal direction, while the holes may be inclined by about 16 degrees. Such a regulator may be mounted on the discharge port 6a of the spray means 10 shown in FIG. 1 so as to be directed as shown in FIG. 5. An apparatus thus constituted was operated to form an insulation coating on an iron core 7 and, as the result, an extremely superior coating having a smooth appearance and a uniform thickness could be obtained.

Figure 4A:
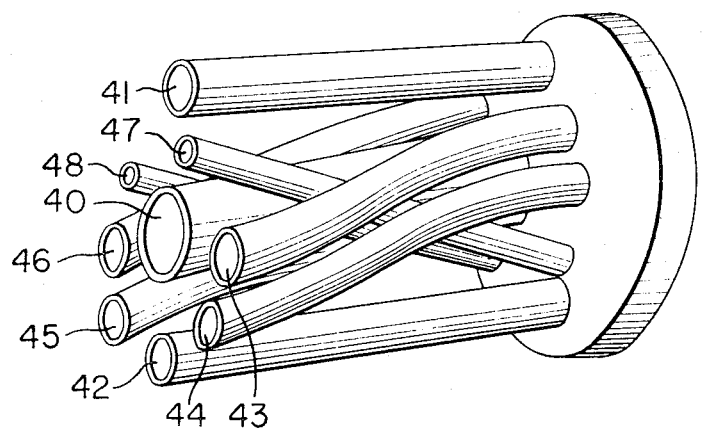
FIGS. 4a and 4b show perspective views of modified forms of the powder material direction regulator.
Figure 4B:
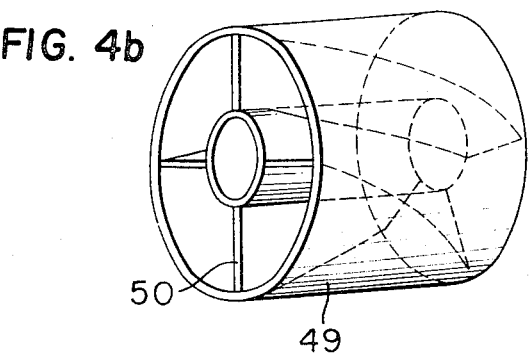

Further, the regulator as described above may be substituted by the one having a hearing 40, straight pipes 41 and 42, inclined pipes 43, 44, 45, 46, 47 and 48 as shown in FIG. 4a, or the one having a plurality of curved blades 50 secured in a rotatable frame 49 as shown in FIG. 4b. Thus, a regulator of any shape and structure may be used provided that it can direct the powder flow so that the powder can impinge on the groove surface of the coil receiving portions.

FIG. 5 shows an example of the way of mounting a disc type regulator which, in contrast to that shown in FIG. 3, does not have any uninclined holes but in which all of the holes therein are inclined. In this case, the diameter of the holder 6 or, in other words, the diameter of the discharge port 6a is substantially larger than that of the core 7.

According to the many experiments made by the inventors, the followings are required in order to completely eliminate problems of nozzle clogging, air pipe clogging and troubles due to humidity.

(1) The powder discharge port should be equal to (including slightly smaller than) or greater than the diameter or the size of the article to be coated, such as the iron core of an electric winding, so that the powder material can be uniformly sprayed all over the end faces of the core. Further, the guide pipe between said discharge port and the powder material supply means should be sufficiently large to preclude the problem of clogging. The discharge port is normally directed substantially horizontally but the direction may be inclined within 45 degrees from horizontal with respect to the coil receiving portions and the end faces of the core.

(2) A single powder discharge port should be provided so that the powder material is sprayed in only one direction. This is effective to minimize the number of powder passages to thereby minimize the factors causing clogging and, at the same time, effective to substantially reduce the amount of splash of powder whereby an improvement can be expected from the view point of material efficiency, working surroundings and safety.

(3) A shielding mechanism is provided at the side of the article to be coated opposite to the side at which the powder material is supplied and the powder material reeffected by the shield mechanism is used to effectively coat said opposite side of the article. By this arrangement, the opposite end faces of the article can simultaneously be coated with higher rate.

The effective shielding area of the mechanism (the area on one side of the shielding plate) may be determined in accordance with the amount of the powder supply, the supply pressure, several factors (the amount of removal, the suction pressure, and the diameter and the area of the suction duct) in the suction type surplus powder removal system and the distance between the article to be coated and the shielding mechanism, however, a suitable value may be chosen within the range of 80 to 160 percent of the diameter and the area of the article to be coated, such as the iron core of an electric winding. As described above, a practically acceptable insulation coating will be obtained with the effective shielding surface selected within the range of 35 to 380 percent of said diameter and the area of the article when the shield plate is rotated or varied in shape so that it has a convex or concave surface.

(4) Further, when electrostatically charged particle is used, the article to be coated is maintained at a temperature below the softening point of the powder material and, after the charged material is adhered to the article, it is heated to a temperature which is sufficiently high to cause melting of the powder material to completely adhere through melting onto the article to be coated.

(5) A regulator for controlling the direction of discharge of powder material is mounted at the powder discharge port so as to regulate the direction of the powder discharge to form a uniform coating on the coil receiving portions of the core as well as on the end faces thereof. This regulator has an effect of dividing the discharge port into a plurality of port sections so that the powder material from the port section is caused to impinge with various angles on the article to be coated.

With the above described arrangement, prior problems such as clogging of air pipe and nozzles and coatings of uneven thickness can completely be eliminated and, moreover the apparatus is simple and can be operated automatically.

A further embodiment of the present invention will now be described with reference to FIGS. 6 and 7. In FIG. 6, the reference numeral 101 shows two powder material supply means disposed one at each side of the apparatus and constituted and the supply means 1 in FIG. 1. A centrifugal blower for producing an air flow for conveying the powder material is connected with a driving power source such as a variable speed motor, the amount of the powder supply may be adjusted either by varying the speed of the motor or adjusting the powder outlet port in the means 101. When the motor is operated, the blower serves to cause the powder material pass from each of the supply means 101 through an associated expansible bellows type guide pipe 102 to a holder 103 which has a powder supply port 103a and is capable of holding a portion of an article 104 to be coated. Since the article 104 is an iron core having a rotatable shaft 104a, the holder 103 is provided therein with a holding tool 105 which holds an end of the shaft 104a and, at the same time, serves to mask it. A threaded member 106 is threadably inserted into the holding tool 105 in order to adjust the depth with which the shaft 104a is inserted into the holding tool 105. When the process is carried out continuously, it is preferred to provide in the holding tool a cooling system for circulating water, air and the like. The first powder material spray means 107 comprising the holder 103 and the holding tool 105 is slidable on a slide plate 109 mounted on a base 108 which also support other various components of the apparatus. Further, a suitable vertically reciprocating means may be provided in order to automatically perform the supply of the article 104 to be coated. A second powder material spray means 110 is provided at the side opposite to the first means 107. This means 110 comprises a duct 111 having a powder supply port 111a, and bearing means 112 disposed in the duct, the bearing means 112 carrying a holding pipe 113 which holds the other end of the shaft 104a of the core 104 and, at the same time, serves to mask said end of the shaft 104a. The holding pipe 113 has at the other end a pulley 117 secured thereto by a washer 113 and a nut 119, the pulley being driven by a motor 112 through a belt 120 and a pulley 122.

The first and the second powder material spray means 107 and 110 have secured thereto at their powder supply ports 103a and 111a, respectively, powder direction regulators 114 and 115, each comprising a powder direction regulating section 114a or 115a and a powder shield section 114b or 115b. Each regulator is of semicircular shape and said sections are formed at the upper and lower halves, respectively. Each of the regulating section 114a or 115a is provided with discharge ports 116a, 116b or 116'a, 116'b which have various discharge angles. The regulators 114 and 115 are so arranged that the powder material from the ports 116a and 116b impinges onto the shielding section 115b and that from the ports 116'a and 116'b impinges onto the shielding section 114b.

Further, a suction mechanism (not shown) such as a dust collector is provided in order to rapidly remove surplus powder material in the directions shown by arrows A and B or C and D.

In operation, the core 104 is preheated to a temperature to melt the powder material to be deposited thereon and thereafter mounted on the apparatus with one end of the shaft 104a secured to the holding pipe 113 of the second powder spray means 110 and the other end inserted into the holding tool 105 of the first powder spray means 107. Then, the motor 122 is started to rotate the holding pipe 113 and therefore the core 104 through power transmission device comprising pulleys and a belt. Thereafter, the powder material supply means 101 are operated. Thus, the powder material is fed through the guide pipe 102 into the first and the second powder spray means 107 and 110, and sprayed through the ports 103a and 111a and the regulating sections 114a and 115a of the regulators 114 and 115 respectively onto the end faces of the core 104. It is to be noted that the regulating sections 114a and 115a are important to form uniform insulation coatings on the walls of the coil receiving grooves 104b of the core 104. By providing a plurality of diametrically and/or circumferentially spaced discharge ports 116a, 116'a, 116b and 116'b, the powder material from each port can positively impinge on the walls of the grooves 104b, a portion of the powder depositing directly on the portion of the wall surface where it impinges and the remainder bouncing and impinging other portions of the wall surface to deposit thereon. Then, the powder material is effectively molten and coated on the grooves 104b.

A portion of the powder material which has been discharged from the means 107 or 110 and has passed through the grooves 104b in the core 104 toward the other means 110 or 107 impinges onto the powder shielding section 115b or 114b as the case may be, and is reflected toward the adjacent end face of the core 104 to be deposited thereon.

Surplus powder is rapidly removed in the directions shown by the arrows A and B by means of a suction mechanism, not shown.

As in the previous embodiment, uniform coatings can be obtained on the end faces of the core 104 as well as on the coil receiving grooves 104b thereof without any deposit on the outer periphery of the core 104. Further, the edge portions of the core can also be uniformly covered just as in flat portions.

As apparent from the above description, the significant features of this embodiment are (1) that a pair of powder shielding mechanism are disposed at positions opposed in the direction of powder discharge, (2) that the powder material is discharged in various directions on to the end faces of the article to be coated, (3) that the powder material reflected by each powder shield mechanism is deposited on the end face of the opposite side, and (4) that surplus powder material is removed by means of a suction mechanism such as a dust collector so that it does not splash or deposit on such portions where coatings are not required.

Figure 7A:
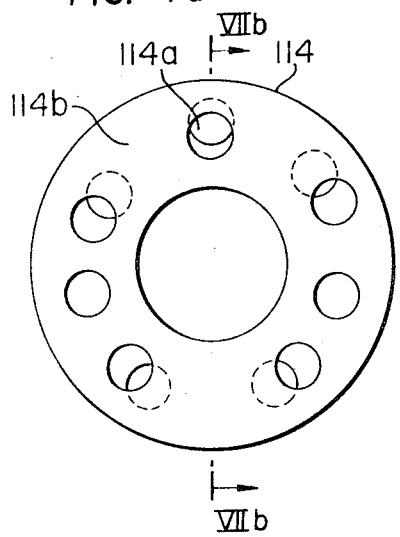
FIGS. 7a and 7b are a front view and a sectional view taken along the line a—a respectively of a modified regulator which is to be mounted on the powder material supply port.
Figure 8A:
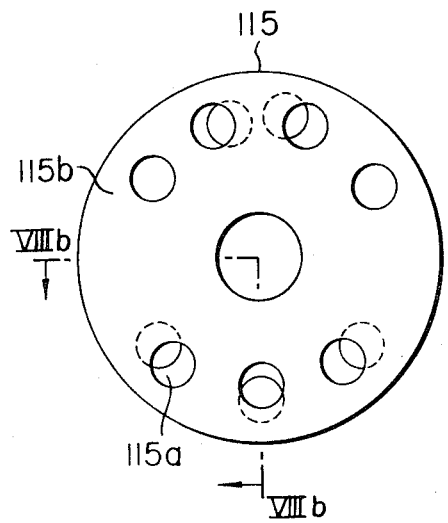
FIGS. 8a and 8b are a front view and a sectional view taken along the line a—a respectively of another modified regulator which is to be mounted on the powder material supply port.
Figure 7B:
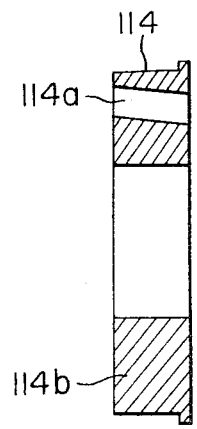
Figure 8B:
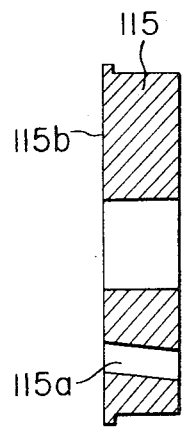

In the apparatus shown in FIG. 6, the regulators 114 and 115 may be substituted by those shown in FIG. 7. In the regulators 114 and 115 shown in FIG. 7, powder direction regulating sections 114a and 115a and powder shield sections 114b and 115b are alternately formed along the circumferential direction. The regulators 114 and 115 are of course so disposed that the regulating sections 114a or 115a of one regulator are opposed to the shielding sections 115b or 114b of the other regulator. It is of course possible in this embodiment to provide only one powder supply means for supplying powder material to both of the discharge means.

The present invention has been described with respect to particular embodiments illustrated in the drawings, however, various modifications or changes can be made without departing from the spirit of the present invention. For example, the process may be carried out with the article to be coated held stationary while rotating the powder material spray mechanism.

What is claimed is:

1. A method of coating specific areas of an iron core of an electric winding article with a thermally insulating meltable powder comprising the steps of:
    (a) heating the article above the melting point of the meltable powder,
    (b) spraying said meltable powder from one side of the article toward the end face of said article through multivaried directional orifices so that particles of said meltable powder are deflected in different directions;
    (c) reflecting the sprayed powder on an element on the other side of the article so as to effect deposition of the sprayed powder on the end face of the article, and
    (d) removing any sprayed powder not deposited on said article.

2. The method of claim 1 wherein the article to be insulation coated is a rotor or a stator of an electric rotary machine and the reflecting element covers the end face of the iron core.

3. The method of claim 1 wherein spraying is effected from both sides of the core over substantially half of the area of the adjacent end faces which end faces are in complemental relationship with each other and the reflecting element are plates provided on both sides of said core and substantially covering the area of the end faces of the core over which powder is not sprayed onto so as to effect deposition of said powder on said area of the end faces.

4. A method of coating specific areas of an iron core of an electric winding article with a thermally insulating powder comprisng the steps of:

(a) maintaining the article at ambient temperature or heating it below the temperature of the softening point of the powder material used as the coating material;

(b) spraying an electrostatically charged powder material from one side of the article toward the end face of said article through multi-varied directional orifices so that particles of said electrostatically charged powder are deflected in different directions;

(c) reflecting the sprayed powder on an element on the other side of the article so as to effect deposition of the sprayed powder on the end face of the article;

(d) heating said coated article to a temperature sufficient to meet the powder material thereon; and (e) removing any sprayed powder not deposited on said article.

5. The method of claim 4 wherein the slotted iron core of an electric winding is heated below the temperature of the softening point of the powder material which is electrostatically charged and after the article is coated, heating it to a temperature sufficient to melt the powder material thereon.

References Cited

UNITED STATES PATENTS

| | | | |
|---|---|---|---|
| 3,247,004 | 4/1966 | Dosser | 117—24 |
| 3,291,630 | 12/1966 | Deyle et al. | 117—24 |
| 3,311,085 | 3/1967 | Smith | 118—316 |
| 3,344,772 | 10/1967 | Lobash et al. | 118—308 |
| 3,355,310 | 11/1967 | De Jean et al. | 117—18 |
| 3,470,010 | 9/1969 | Christiansen | 117—18 |
| 3,291,631 | 12/1966 | Smith | 118—308 |

MURRAY KATZ, Primary Examiner

M. SOFOCLEOUS, Assistant Examiner

U.S. Cl. X.R.

117—17, 18, 19, 21, 24, 25, 102 R, A, 105.4; 118—627, 310, 315, 316, 318, 323